Feb. 4, 1941.   R. J. SMITH   2,230,766
PLOW HITCH
Filed April 5, 1939   3 Sheets-Sheet 3

Inventor
Ralph James Smith

By Clarence A. O'Brien
and Hyman Berman
Attorneys

Patented Feb. 4, 1941

2,230,766

UNITED STATES PATENT OFFICE 2,230,766

PLOW HITCH

Ralph J. Smith, East Killingly, Conn.

Application April 5, 1939, Serial No. 266,181

2 Claims. (Cl. 97—98)

This invention appertains to new and useful improvements in hitches for agricultural implements, the principal object of the invention being to provide a plow hitch which will permit the plow to ride over stones and other subsoil debris and formations without injury to the plow or hitch mechanism.

Another important object of the invention is to provide a plow hitch which will not only permit the plow to ride over subsoil obstructions but which will also permit the plow to ride laterally of said obstructions.

These and other objects and advantages of the invention will become apparent to the reader of the following specification.

Figure 1:
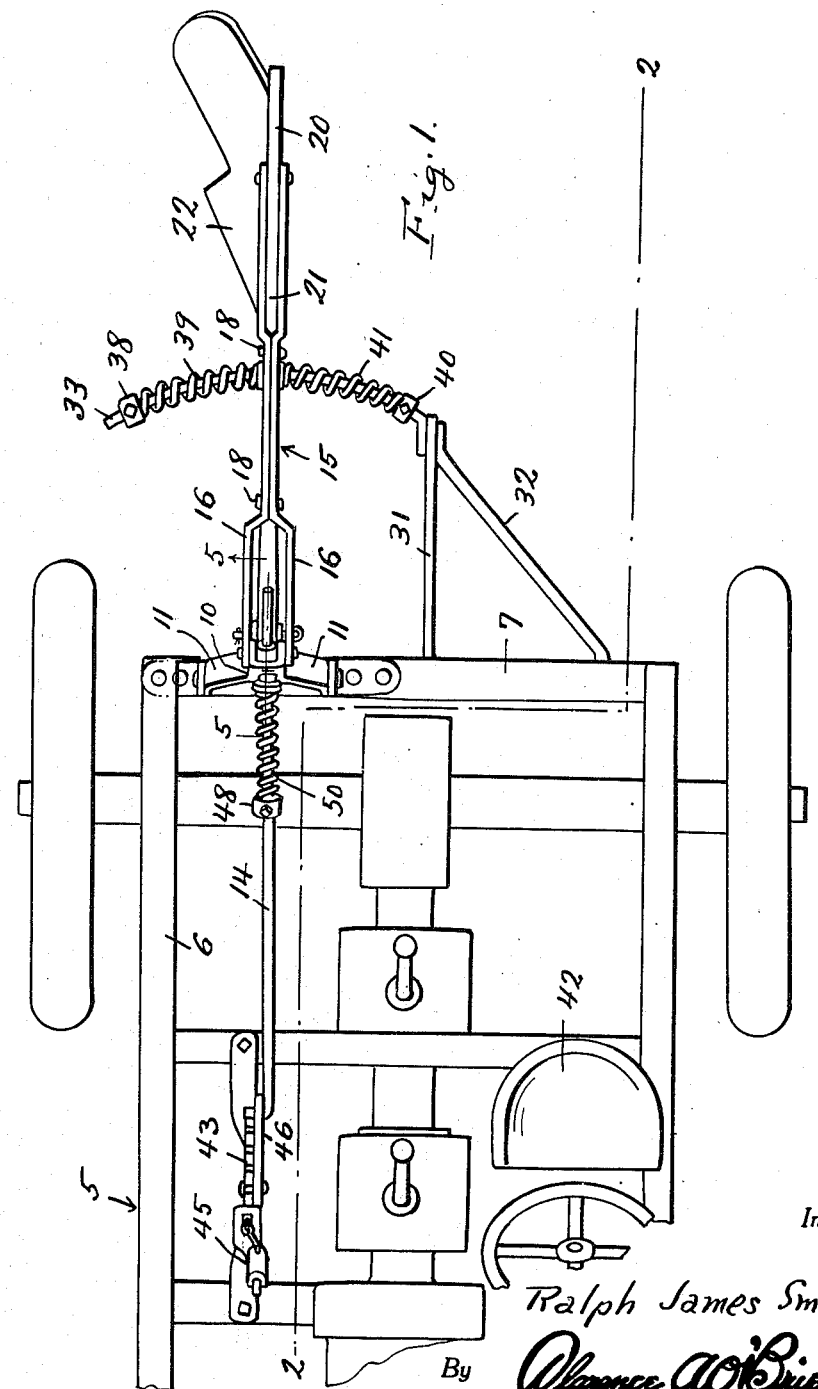
Figure 1 represents a top plan view of the hitch applied to a tractor.
Figure 2:
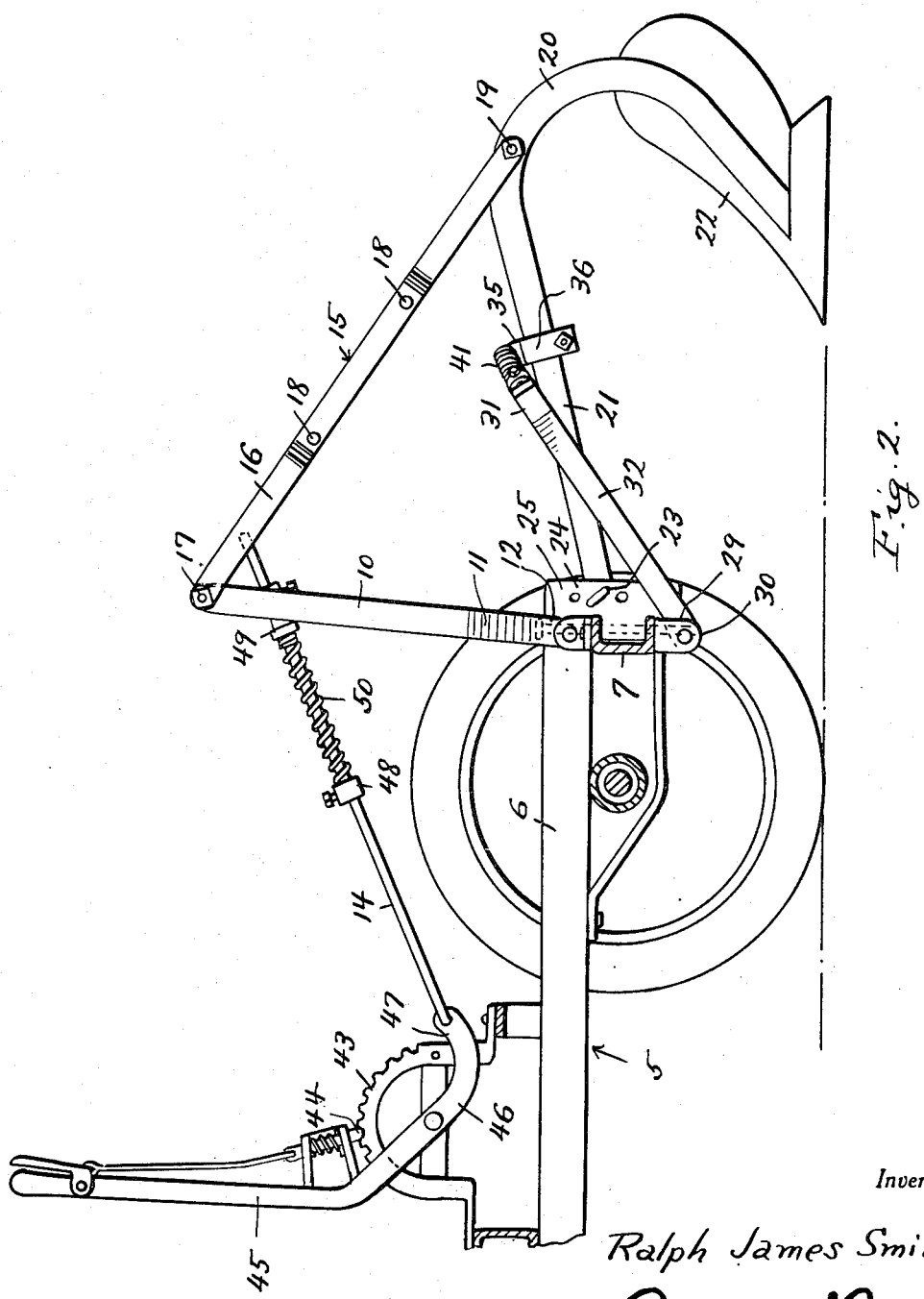
Figure 2 is a section on line 2—2 of Figure 1.
Figure 3:
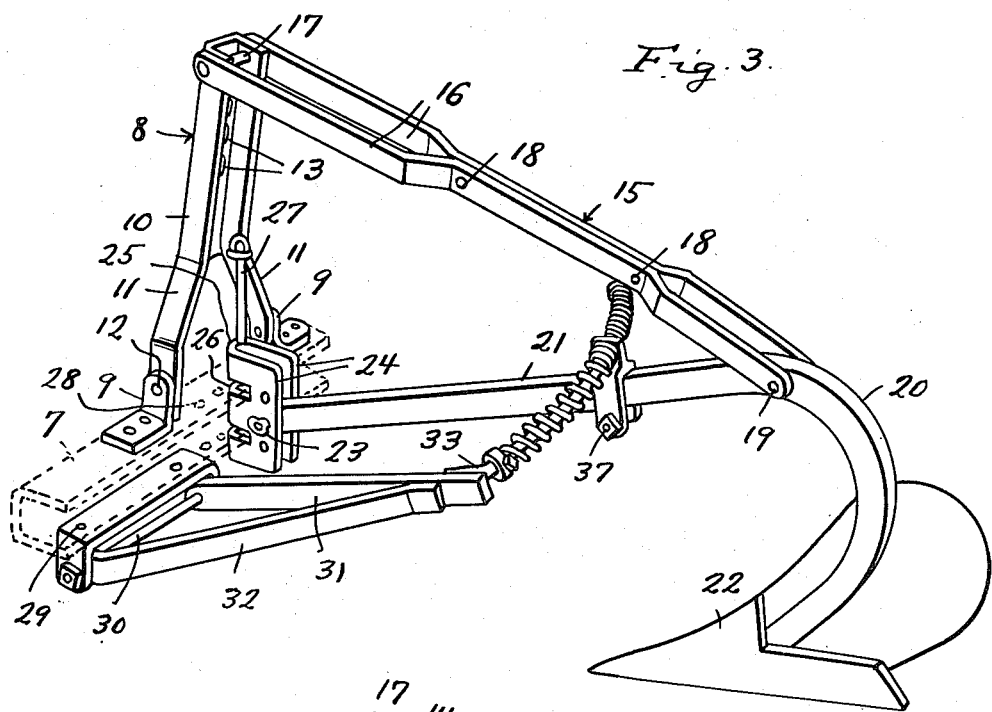
Figure 3 is a perspective view of the hitch.
Figures 4, 5:
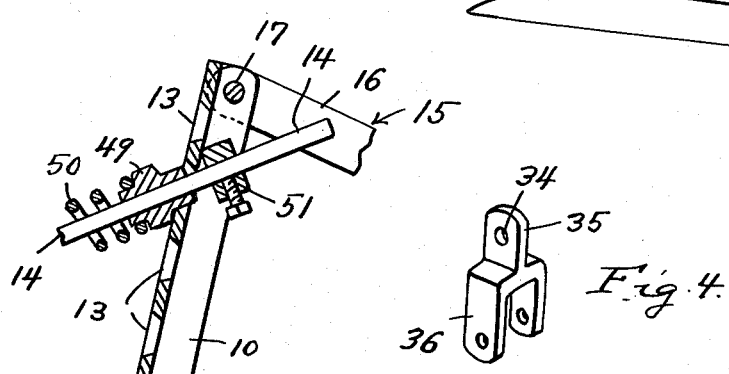
Figure 4 is a perspective view of the clamp lug.
Figure 5 is a sectional view on line 5—5 of Figure 1.

Referring to the drawings wherein like numerals designate like parts, it can be seen in Figure 1 that numeral 5 generally refers to a tractor which includes the frame 6 having the rear cross-bar 7. Numeral 8 generally refers to the hitch which consists of the upstanding lugs 9—9 secured to the chassis bar 7. A channeled member 10 has depending legs 11—11 which are pivotally secured as at 12 to the lugs 9.

The upper portion of the channeled member 10 has openings 13 therein through any one of which the bar 14 can be disposed.

A beam generally referred to by numeral 15 is made up of the two side members 16—16, the forward ends of which are pivotally connected to the upper end of the channeled member 10 by the pin 17. The intermediate portions of these members 16—16 are riveted together as at 18 while the rear portions are spread apart and pivotally secured by the pin 19 to the arcuate portion 20 of the plow beam 21. The lower portion of the arcuate part 20 of the beam 21 carries the plow proper 22 while the forward end of the beam 21 is pivotally secured as at 23 between the side portions 24 of the coupling plate 25, this plate being disposed into U-form and having slots 26 in the bight portion thereof for receiving the flanges of the channeled cross-bar 7. A pin 27 is disposed downwardly through the bight portion of the plate 25 and through corresponding openings 28 in the flanges of the channeled cross-bar 7.

A U-shaped bracket 29 is suitably secured to the lower flange of the channeled bar 7 and this has a pin 30 disposed through the leg portions thereof and through the arm 31 and brace 32 therefor.

A rod 33 of arcuate-shape extends laterally from the outer end of the arm 31 and through the opening 34 of the lug 35, this lug 35 being on the U-shaped member 36 which is bolted as at 37 to the plow beam 21.

A collar 38 is provided on the free end of the rod 33 and between this and the lug 35 is the compression spring 39 while between the collar 40 at the inner end of the rod 33 and the opposite side of the lug 35 is the compression spring 41. Thus it can be seen that the plow beam 21 is held centralized by the compression springs 39 and 41, but that in the event of the plow 22 striking any subsoil obstruction, the plow proper and its beam 21 can yield either to one side or the other to avoid the obstruction.

Adjacent the driver's seat 42 is mounted the quadrant rack 43 with which the detent 44 on the hand lever 45 is engageable. This hand lever 45 has the offset lower portion 46 and the upwardly curved lower end portion 47 apertured to receive the laterally disposed end portion of the aforementioned rod 14. This rod 14 has the collar 48 thereon and between this and the bushing 49 is the coiled compression spring 50, the same serving normally to urge the plow 22 into the ground. The bushing 49 seats into one of the openings 13 and when it is desired to lift the plow, the lever 45 can be swung rearwardly and the rod 14 will serve to pull the plow to an elevated position due to the presence of the collar 51 on the rod 14 at the rear side of the channeled member 10.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A plow structure comprising a draft frame, a plow including a beam, said frame including an end member of channeled construction, a connecting unit between the channeled member and the plow beam, said unit consisting of a vertically disposed channeled member having slots in the back portion thereof for receiving the flanges of the channeled frame member, said channeled frame member having an opening therein, a pin disposed downwardly through the vertically disposed channeled member and through the opening in the channeled frame member, said beam having its forward end disposed into the vertically disposed channeled member, and a pivotal connection between the beam and the side portions of the vertically disposed channeled member and means for lifting and lowering the said plow beam, a swingable arm structure extending from the channeled frame member and being pivotally connected thereto, an arcuate-shaped rod extending laterally from the arm, a yoke member having an apertured lug through which the rod extends, said yoke being adapted to straddle the intermediate portion of the plow beam, and compression springs on the rod, one at each side of the said lug.

2. A plow structure comprising a draft frame, a plow including a beam, said frame including an end member of channeled construction, a connecting unit between the channeled member and the plow beam, said unit consisting of a vertically disposed channeled member having slots in the back portion thereof for receiving the flanges of the channeled frame member, said channeled frame member having an opening therein, a pin disposed downwardly through the vertically disposed channeled member and through the opening in the channeled frame member, said beam having its forward end disposed into the vertically disposed channeled member, a pivotal connection between the beam and the side portions of the vertically disposed channeled member, means for lifting and lowering the said plow beam, a swingable arm structure extending from the channeled frame member and being pivotally connected thereto, an arcuate-shaped rod extending laterally from the arm, a connecting member between the arcuate-shaped rod and the beam, said arcuate-shaped rod being slidably disposed through the connecting means, and a compression spring on the rod at each side of the connecting means.

RALPH J. SMITH.